April 27, 1965     A. J. GRABOWSKI     3,180,570
HYDRAULIC WIND MACHINE
Filed March 25, 1963                          2 Sheets-Sheet 1
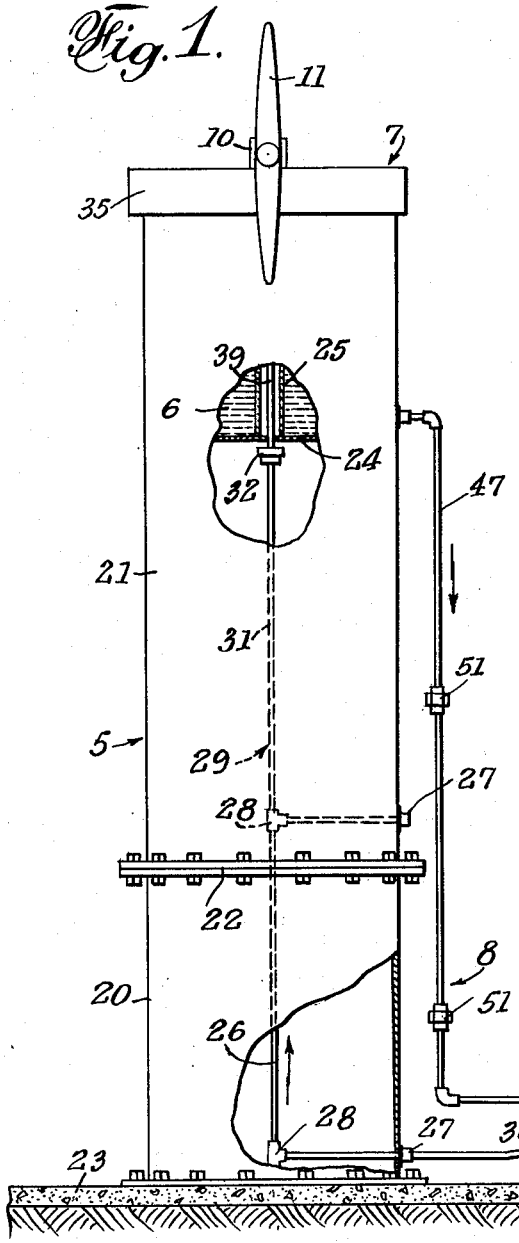
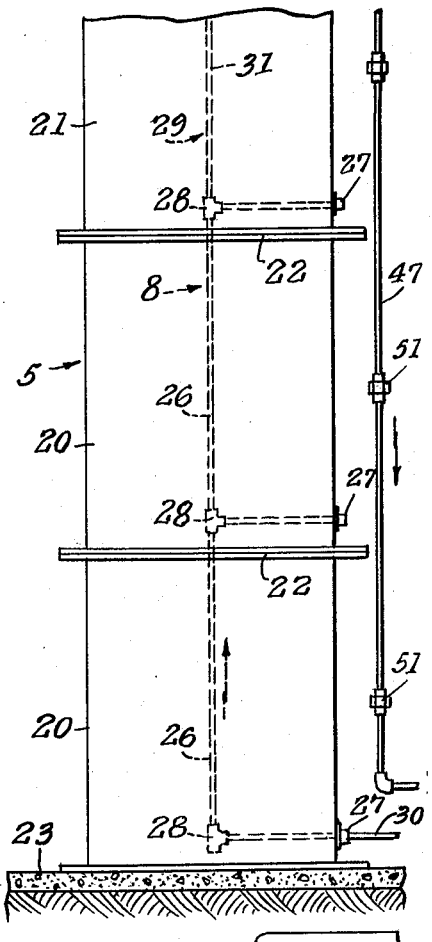
INVENTOR.
ALFRED J. GRABOWSKI
BY C. G. Stratton
ATTORNEY

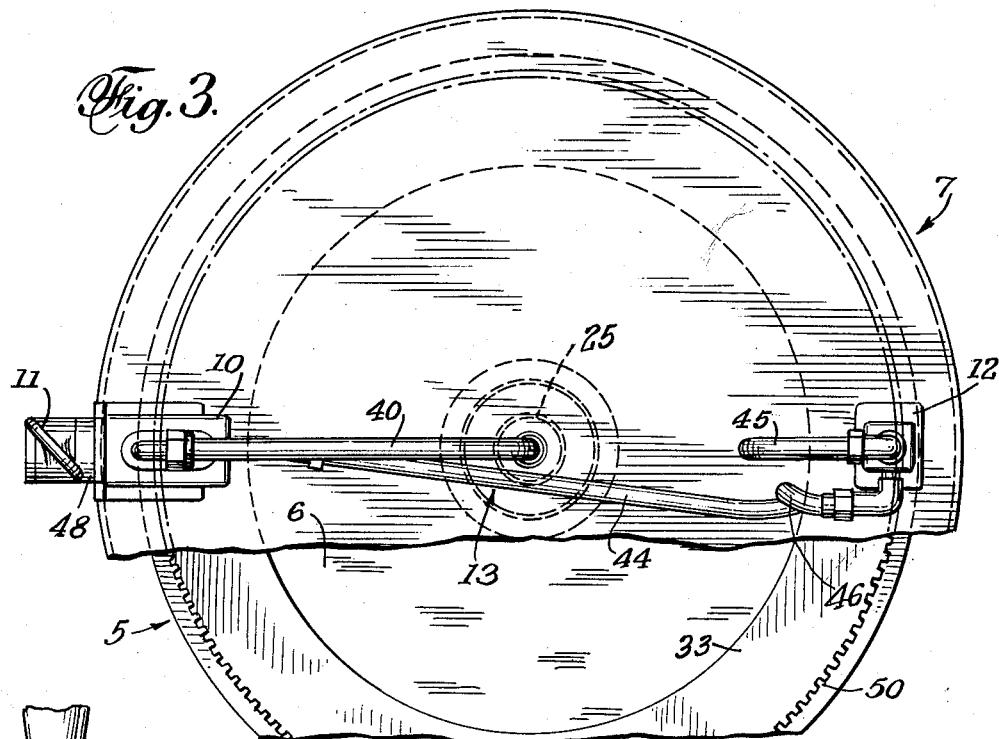
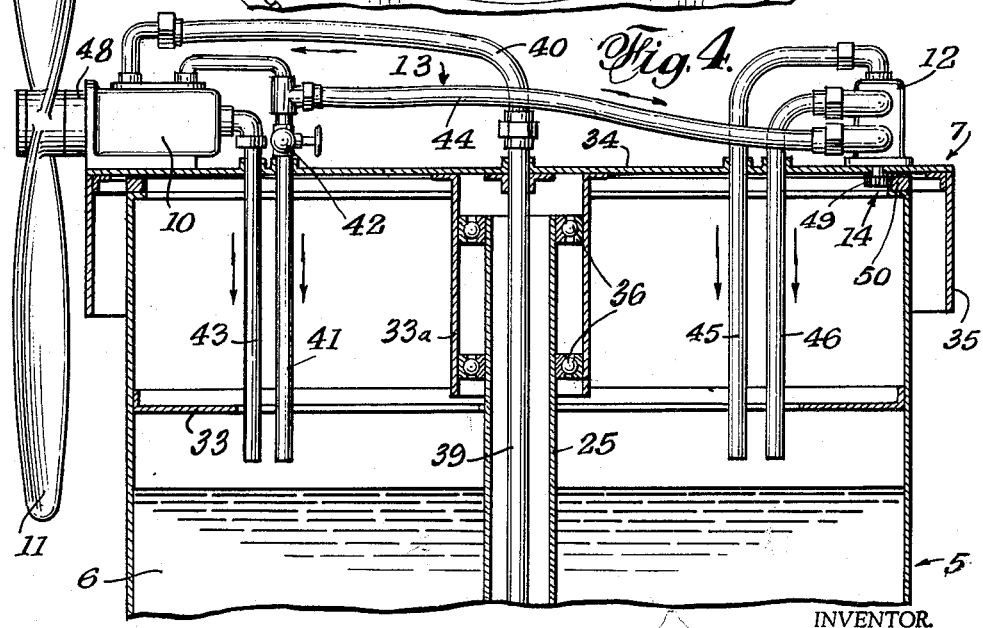

United States Patent Office 3,180,570
Patented Apr. 27, 1965

3,180,570
HYDRAULIC WIND MACHINE
Alfred J. Grabowski, Rte. 2, Box 63, Lindsay, Calif.
Filed Mar. 25, 1963, Ser. No. 267,709
8 Claims. (Cl. 230—254)

This invention relates to a wind machine that may have general use, but is especially adapted for use in citrus orchards for moving the air thereover to minimize frost damage.

An object of the invention is to provide a tower wind machine that is adapted to be increased and decreased in height, thereby enabling ready adjustment, as the trees of the orchard grow taller, or seedlings are planted to replace trees that have ceased to bear marketable crops, to create wind or air movement at a level above the ground according to the tree heights.

Another object of the invention is to provide a hydraulic wind machine that, by providing its power source on the ground, rather than mounting the same on the tower, thereby not only renders height-adjustment easier but also reduces installation costs and enables drive of several wind machines by one power source.

A further object of the invention is to provide a wind machine, as above characterized, that avoids power losses that are due to various factors, such as reduction gearing, a long drive shaft from a ground motor to the wind-generating propeller of the machine, and other remote mechanical parts, the invention providing a machine that employs only hydraulic fluid for both driving such propeller and traversing the same around a circular path to produce wind that radiates from the tower as a center.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawings. However, said drawings merely show, and the following description merely describes, one embodiment of the present invention, which is given by way of illustration or example only.

In the drawing, like reference characters designate similar parts in the several views.

FIG. 1 is an elevational view, partly broken away, of a wind machine according to the present invention.

FIG. 2 is a broken elevational view showing the machine of FIG. 1 increased in height.

FIG. 3 is an enlarged and broken plan view of said machine.

FIG. 4 is a similarly enlarged vertical sectional view of the upper portion of the machine.

The wind machine that is illustrated comprises, generally, a sectional tower 5, a tank 6 for storing hydraulic fluid provided in the upper portion of said tank, a turntable 7 on the top of said tank, a hydraulic system 8, an engine 9 to provide the power for operating said system, a hydraulic motor 10 operated by said system and mounted on said turntable, the same driving a propeller 11 to generate air movement, and a second hydraulic motor 12 on said turntable operated by the fluid return 13 from the motor 10 and operating a drive 14 between the tower 5 and the turntable to slowly rotate the latter to thereby move the propeller in a circular path during wind-generating operation thereof.

The tower 5 preferably comprises one or more sections 20, and a top section 21 bolted together at connection flanges 22 to form a tubular structure that varies in height according to the number of sections used in the assembly. The tower is preferably supported on a stable base such as a cement slab 23. The upper end of the top section is preferably open and spaced below said end is provided a wall 24 from which is fixedly extended a tube 25 that terminates below the top of tower section 21.

Each tower section 20 is provided with a pipe 26 that extends from a fitting 27 vertically and centrally within its respective section, a connection T-fitting 28 being provided in each pipe 26.

It will be clear from FIGS. 1 and 2 that the number of sections 20 used in the assembly of the tower, controls the height of the tower, and that the fitting 28 of an upper section 20 connects with the pipe 26 of a lower section to form a hydraulic power line 29 that is served by a line 30 connected to the fitting 27 of the bottom section 20 of the tower.

The tower section 21 is provided with a pipe 31 that is similar to pipes 26 and has fittings 27 and 28, as above described. Said pipe 31 comprises the upper end of the line 29, the same terminating in a swivel 32 below the wall 24. Those fittings 27 and 28 that are not used as connectors in a particular installation, are plugged or capped.

The tank 6 has said wall 24 as its bottom and is defined, at the top, by a flange wall 33, spaced from the wall 24 to provide a desired fluid capacity. The tube 25 extends centrally through said tank.

The turntable 7 comprises a top plate 34 larger in diameter than the tower section 21, a skirt flange 35 around the upper end of said section 21, and a central tube 33a larger in diameter than the tube 25 and telescoped therewith. Suitable anti-friction bearings 36 are provided between the tubes 25 and 35, the same being designed to minimize radial as well as thrust friction to ease the rotation of the turntable around the center of the tower, as will be seen hereinafter.

The hydraulic system 8 includes the mentioned pipes 26, 29 and 30 and interconnects the hydraulic motors 10 and 12 and the storage tank 6 with a hydraulic pump 37 which is driven by the drive shaft 38 of the engine 9. Said system 8 further comprises a feed line 39 that extends from the swivel 32 through the tube 25, a connection 40 from the end of line 33 to the inlet side of the hydraulic motor 10, a return line 41 from the motor 10 and discharging into the tank 6, a valve 42 to control flow in line 41, and a by-pass line 43 from said hydraulic motor and emptying into the tank 6. The fluid return 13 is part of the hydraulic system 8 and is shown as a drive connection 44 from the return line 41 (above the valve 42) to the inlet side of the motor 12. Said system 8 further comprises a return line 45 from the latter motor and discharging into the tank 6, a by-pass line 46 from motor 12 to said tank, a return flow connection 41 from the tank 6 to the hydraulic pump 37.

The propeller 11 is driven by the motor 10, through a thrust bearing 48 by direct flow of pressure fluid from the pump 37 to said motor. The motor 12 is driven by return fluid from motor 10, the valve 42 controlling the rate of flow, as desired.

The drive 14 is shown as a pinion gear 49 on the output shaft of the motor 12 and a fixed internal ring gear 50 on the top of section 21 of the tower 5. It will be clear that this gearing arrangement, which may include reduction gearing, provides for slow rotational traverse of the turntable while the propeller 11 is driven directly, at high speed, by the motor 10.

The connection 47 is shown as connected pipe sections which, by means of union joints 51, make up a length to suit the height of the tower 5.

Changing the height of the tower entails merely addition or removal of sections 20 with the pipes 26 therein, and commensurate addition or removal of the sections of flow connection 47. All other component parts of the machine do not require to be adjusted.

It will be also clear that the same engine 9 may be arranged to drive a plurality of pumps 37 to operate the hydraulic systems of a plurality of towers and that only plumbing, i.e. piping 30 and 47 for each tower, is required to connect the several pumps 37 to their respective towers.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A hydraulic wind machine comprising:
   (a) a tower formed of a plurality of vertical separably-connected tubular sections,
   (b) separably-connected hydraulic piping extending centrally in said sections,
   (c) a turntable rotationally mounted on top of said tower,
   (d) a hydraulic pump disposed remote from said tower and adapted to be connected to said piping,
   (e) a propeller mounted on and movable with the turntable,
   (f) a geared connection between the tower and the turntable, and
   (g) a hydroulac system, that includes said piping and said pump, to simultaneously drive the propeller and operate the geared connection to turn the turntable.

2. A hydraulic wind machine according to claim 1 in which
   (a) the tower, in the uppermost section thereof, is provided with a storage space for hydraulic fluid, the fluid flowing in said system being stored in said space, and
   (b) the system including piping to conduct fluid from the space to the hydraulic pump.

3. A hydraulic wind machine according to claim 2 in which is provided
   (a) a propeller-operating hydraulic motor,
   (b) the hydraulic system including piping to conduct hydraulic fluid directly from said hydraulic pump to said hydraulic motor,
   (c) a second hydraulic motor to drive the geared connection, and
   (d) a connection from the return side of the first motor to the second motor to operate the latter.

4. A hydraulic wind machine according to claim 3 in which both hydraulic motors discharge their operating fluid into said storage space.

5. A hydraulic wind machine according to claim 2 in which
   (a) a central vertical tube extends through the fluid-storing space, and
   (b) anti-friction bearings are interposed between said tube and the turntable.

6. A hydraulic wind machine comprising:
   (a) a tower formed of a plurality of vertical separably-connected tubular sections,
   (b) separably-connected hydraulic piping extending centrally in said sections,
   (c) a turntable rotationally mounted on top of said tower,
   (d) a hydraulic pump disposed remote from said tower and adapted to be connected to said piping,
   (e) a propeller mounted on and movable with the turntable,
   (f) a geared connection between the tower and the turntable,
   (g) a hydraulic motor for driving the propeller and a separate motor to drive the geared connection, and
   (h) a hydraulic system, that includes said piping and said pump, to drive the propeller-driving motor, and is provided with a connection from the return of said motor to said separate motor.

7. A hydraulic wind machine comprising:
   (a) a tower formed of a plurality of vertical separably-connected tubular sections,
   (b) separably-connected hydraulic piping extending centrally in said sections,
   (c) a turntable rotationally mounted on top of said tower,
   (d) a hydraulic pump disposed remote from said tower and adapted to be connected to said piping,
   (e) a propeller mounted on and movable with the turntable,
   (f) a geared connection between the tower and the turntable,
   (g) a hydraulic motor for driving the propeller and a separate hydraulic motor to drive the geared connection,
   (h) a hydraulic system, that includes said piping and said pump, to drive the propeller-driving motor, and is provided with a connection from the return of said motor to said separate motor,
   (i) a fluid-storing space in the uppermost section of the tower, both said hydraulic motors discharging into said space, and
   (j) piping included in said hydraulic system to conduct stored fluid in said space to the hydraulic pump.

8. A wind machine comprising:
   (a) a top section provided with space to store hydraulic fluid,
   (b) at least one lower section to space the top section above the ground,
   (c) a turntable on the top section and mounting a propeller-rotating hydraulic motor and a table-turning hydraulic motor,
   (d) a hydraulic pump remote from said sections,
   (e) a hydraulic feed line from said pump extending centrally through said sections and the fluid-storing space therein, and connected to the propeller-rotating motor to drive the same,
   (f) a connection between the return of the latter motor and the table-turning motor to drive the latter motor,
   (g) both said motors having their return lines disposed to discharge into said fluid-storing space, and
   (h) a return connection between said space and the hydraulic pump.

References Cited by the Examiner
UNITED STATES PATENTS

| | | | |
|---|---|---|---|
| 1,442,467 | 1/23 | Chernesky | 230—258 |
| 1,848,398 | 3/32 | Towt | 47—2 |
| 2,117,310 | 5/38 | Garrott | 230—258 |
| 2,481,702 | 9/49 | Towt | 230—254 X |

EDGAR W. GEOGHEGAN, *Primary Examiner.*

JULIUS E. WEST, *Examiner.*